UNITED STATES PATENT OFFICE.

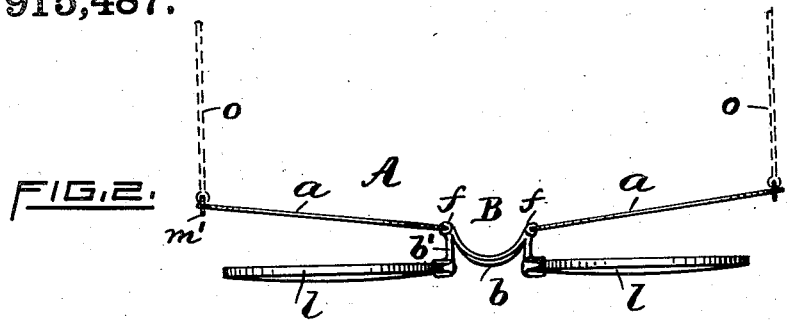
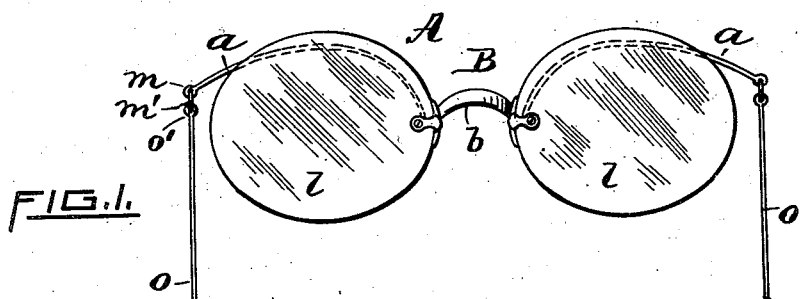
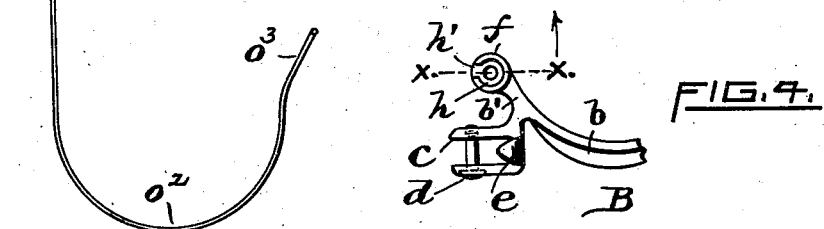
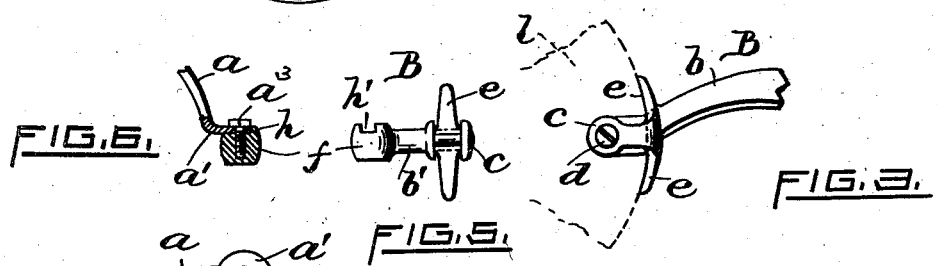

JOSEPH SAVOIE, OF CENTRAL FALLS, RHODE ISLAND, ASSIGNOR OF ONE-FOURTH TO EDWARD C. GLINES, OF PROVIDENCE, RHODE ISLAND, AND ONE-FOURTH TO NAPOLEON HERBERT, OF CENTRAL FALLS, RHODE ISLAND.

SPECTACLES.

No. 915,487.

Specification of Letters Patent. Patented March 16, 1909.

Application filed July 14, 1908. Serial No. 443,430.

*To all whom it may concern:*

Be it known that I, JOSEPH SAVOIE, a subject of the King of Great Britain, and a resident of Central Falls, in the county of Providence and State of Rhode Island, have invented certain new and useful Improvements in Spectacles, of which the following is a specification.

My invention relates to improvements in spectacles, but more particularly, however, to the class of spectacles having frameless or rimless lenses, and it consists, essentially, of a pair of spectacles having the centra nose-piece or bridge uniting the lenses thereof provided with a pair of oppositely arranged bendable resilient holding wires, as they may be termed, and a pair of temple or bow members jointed to the outer free ends of said holding wires, all as more fully hereinafter set forth and claimed.

The object I have in view is to provide spectacles with a simple, light, inexpensive and efficient device capable of being quickly and easily bent or positioned so as to place the lenses at the desired distance with respect to the eyes of the wearer, and at the same time have the spectacles adapted to be readily attached to or disconnected from the head.

In the accompanying sheet of drawings: Figure 1 represents a front view of a pair of frameless spectacles embodying my improvement, one of the bows being only partly shown. Fig. 2 is a corresponding top plan view, the bows being indicated by dotted lines. Fig. 3 is a front elevation, on enlarged scale, showing a portion of the nose-piece. Fig. 4 is a corresponding top view, the lens being omitted. Fig. 5 is a side or end view corresponding with Fig. 3. Fig. 6 is a vertical sectional view, taken on line $x$—$x$ of Fig. 4, and also showing the manner of removably securing the inner end of the holding-wire to the rear lug or ear of the nose-piece, and Fig. 7 is a plan view, still further enlarged, showing the form of the said end portion of the holding-wire.

The following is a more detailed description of the invention:

A designates a pair of spectacles provided with my improvement. The lenses $l$ are or may be frameless, substantially like the well-known eye-glasses. The two lenses are united by a suitable nose-piece or bridge B of metal, as gold or plated stock. The tie portion proper, $b$, terminates at each end in a pair of laterally separated ears $c$ and the vertically extending curved members $e$, constructed substantially as usual. The inner end of the lens is inserted between said ears until its edge bears snugly against the face of the said curved members $e$, after which a screw $d$ is passed through the front ear and the adjacent portion of the lens and screwed into the back ear, thus securing the lens to the nose-piece. Each end of the nose-piece extends rearwardly past said ear portion and forms a short neck $b^1$ terminating in the hub or lug member $f$. This latter, as drawn, is counterbored (Figs. 4 and 6) at the top end to produce a recessed seat or socket $h$ having the circumscribing rim or flange cut away to form an opening $h^1$ communicating with the socket. The center of the hub is tapped to receive a screw $a^3$.

The two members, $a$, which I have termed holding wires, consist each of a piece of thin, light, resilient and bendable wire having its inner or lower end flattened or otherwise constructed to form a foot $a^1$ (Fig. 7) adapted to be fitted into the said socket $h$ and opening $h^1$. A screw $a^3$ passing downwardly through the hole $a^2$ of the part $a^1$ and screwed into the hub serves to firmly maintain the holding wire in position both longitudinally and laterally. As thus devised the screw itself is less liable to become accidentally loosened but may be readily removed when desired.

I prefer to bend the holding wire $a$ to the approximate curvature of the upper part of the lens and to position it in a plane substantially parallel with the latter, or at a slight angle therewith, as shown in Fig. 2. The free end of the holding wire extends beyond the outer end of the lens and above the median line of the latter, and as shown terminates in an eye or small loop $m$ carrying a link $m^1$, which in turn passes through an eye $o^1$ of the light wire bow $o$. The latter may be bent, as indicated at $o^2$, $o^3$, so as to pass over and back of the ear of the wearer. As thus constructed the connection practically constitutes a universal joint, thus permitting the bow $o$ to be readily swung to any desired position, or even be folded flatwise so as to be inserted in a case.

In order to properly adapt and position my improved spectacles to the eyes of the individual wearer (assuming, however, that suitable lenses $l$ have first been selected and secured to the rigid bridge member B) the spectacles are placed so that the bridge rests directly upon the nose, the latter then supporting the spectacles substantially as usual in articles of this class. The optician next if necessary further bends the curved holding wires $a$ (already rigidly secured to the respective ends of the bridge) substantially as shown in Fig. 1 and also laterally as shown in Fig. 2 so as to adjust and position the lenses with relation to the eyes, thereby not only placing them at the proper distance from the eyes but at the same time causing the plane of the lenses to stand at substantially right angles to the normal line of vision; this is followed by correspondingly bending the rear portion of the bows $o$, which pass over and engage the back of the ears of the wearer, thus holding the spectacles in place. It may be added that by reason of my improvement the lenses of the spectacles are maintained in the said properly adjusted relation and position at all times because they move bodily with the movements of the head without any change or variation. The holding wires $a$ are bent so as not to interfere at all with vision because, as shown in Fig. 1, each wire normally conforms to the upper periphery of its lens $l$, the latter as usual being materially larger than the curvature of the upper eye-lid and adapted to lie above the edge of the eye-lid even when the latter is opened to its normal limit. The wires $a$ are when in use adapted to lie laterally between the lenses $l$ and the respective eyes of the wearer and do not practically contact with the eye-lids, except very slightly, thus also constituting resilient gage or distance members for insuring the proper relative distance between the front of the eyes and the face of the lenses $l$; the bows $o$ at the same time maintaining the spectacles themselves in position upon the head. It may be added that with the exercise of ordinary care the said adjustment of the wire members $a$ and $o$ remains practically unaffected after they are first bent by the optician to adapt the spectacles to the user. It is obvious, however, that it is a comparatively easy and simple matter for an optician to readjust the said members if desired. Thus it will be obvious that when the several members are properly adjusted, as just stated, the distance between the back of the lenses and the eyes, always remains the same owing to the fact that the bows or ear-wires $o$ and the holding-wires $a$ act to positively prevent the lenses from moving nearer to or farther from the eyes of the wearer.

I claim as my invention and desire to secure by United States Letters Patent,—

1. As an improved article of manufacture, frameless spectacles having the two lenses thereof united at their inner ends by a nose-piece or bridge, a pair of oppositely disposed bendable resilient holding wires secured to said nose-piece adapted when in use to lie between the lenses and the eyes of the wearer, and suitably shaped bow members jointed to the outer ends of said holding wires.

2. As an improved article of manufacture the frameless spectacles substantially as herein described, the same consisting of a pair of oppositely disposed lenses, a central nose-piece having the lenses secured thereto and provided with rearward lugs or ears, a pair of resilient holding wires fixed in said lugs each extending outwardly therefrom in a curved form past the corresponding lens so as not to obstruct the vision of the user, and a temple-bow or analogous means jointed to the free end of the wire.

3. In spectacles of the character described, the combination with a pair of frameless lenses, and a central nose-piece having said lenses mounted therein, of a pair of suitably bent resilient holding wires rigidly secured to the rear portion of the nose-piece and extending outwardly therefrom in a plane substantially parallel with that of the lenses, and means connected with the free ends of said holding wires adapted when in use to engage the head of the wearer, for the purpose set forth.

4. In spectacles of the character described, the combination of the nose-piece having integral rearwardly extending lugs or ears each having a recessed upper seat or socket and a lateral opening communicating therewith, a bent resilient holding wire having an end thereof fitted in said seat and lateral opening, and means for removably securing the said holding wire to said lug.

5. In spectacles, a pair of frameless lenses, a member interposed between and connecting the inner ends of said lenses, oppositely disposed bendable elements located at the rear of the lenses and secured to said connecting member, and temple connections jointed to the outer ends of said bendable elements, both the latter and the temple connections being bent and arranged with relation to one another so that when in use the spectacles are kept in position and the lenses maintained at a predetermined distance from the eyes of the wearer.

6. In a pair of spectacles provided with a central bridge member adapted to rest upon the nose of the wearer, and a pair of lenses secured to said bridge, the combination therewith of a pair of oppositely disposed bendable members $a$ secured to said bridge member and extending in a curved form at the rear of and at a suitable distance from the lenses, and bows jointed to the outer ends of said members $a$, substantially as hereinbefore described and for the purpose set forth.

Signed at Providence, R. I., this 13th day of July, 1908.

JOSEPH SAVOIE.

Witnesses:
   GEO. H. REMINGTON,
   V. SAVOIE.